(No Model.)  2 Sheets—Sheet 1.
C. F. R. A. H. BAGOT.
PNEUMATIC TIRE.
No. 585,615. Patented June 29, 1897.
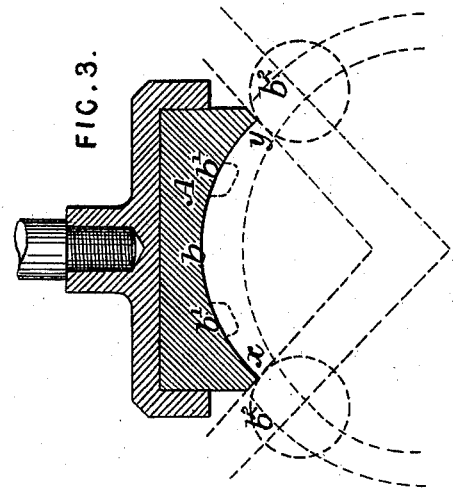
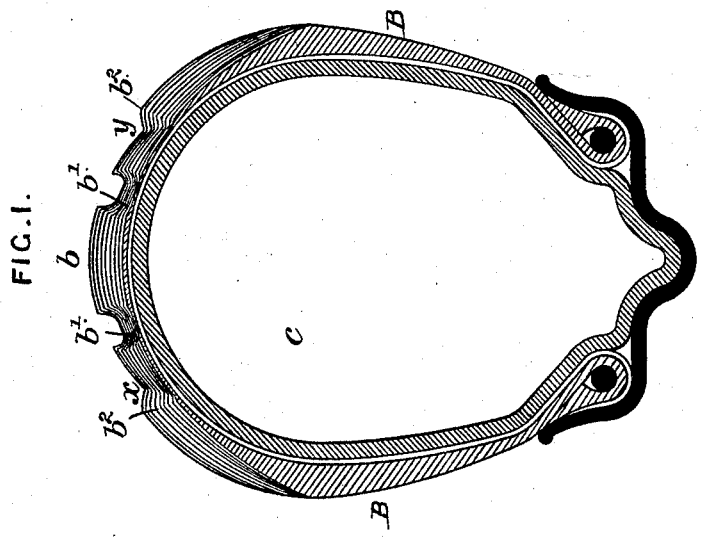
Witnesses:
F. W. Wright
S. C. Connor
Inventor
Charles F. R. A. H. Bagot
By his attorneys
Howson & Howson

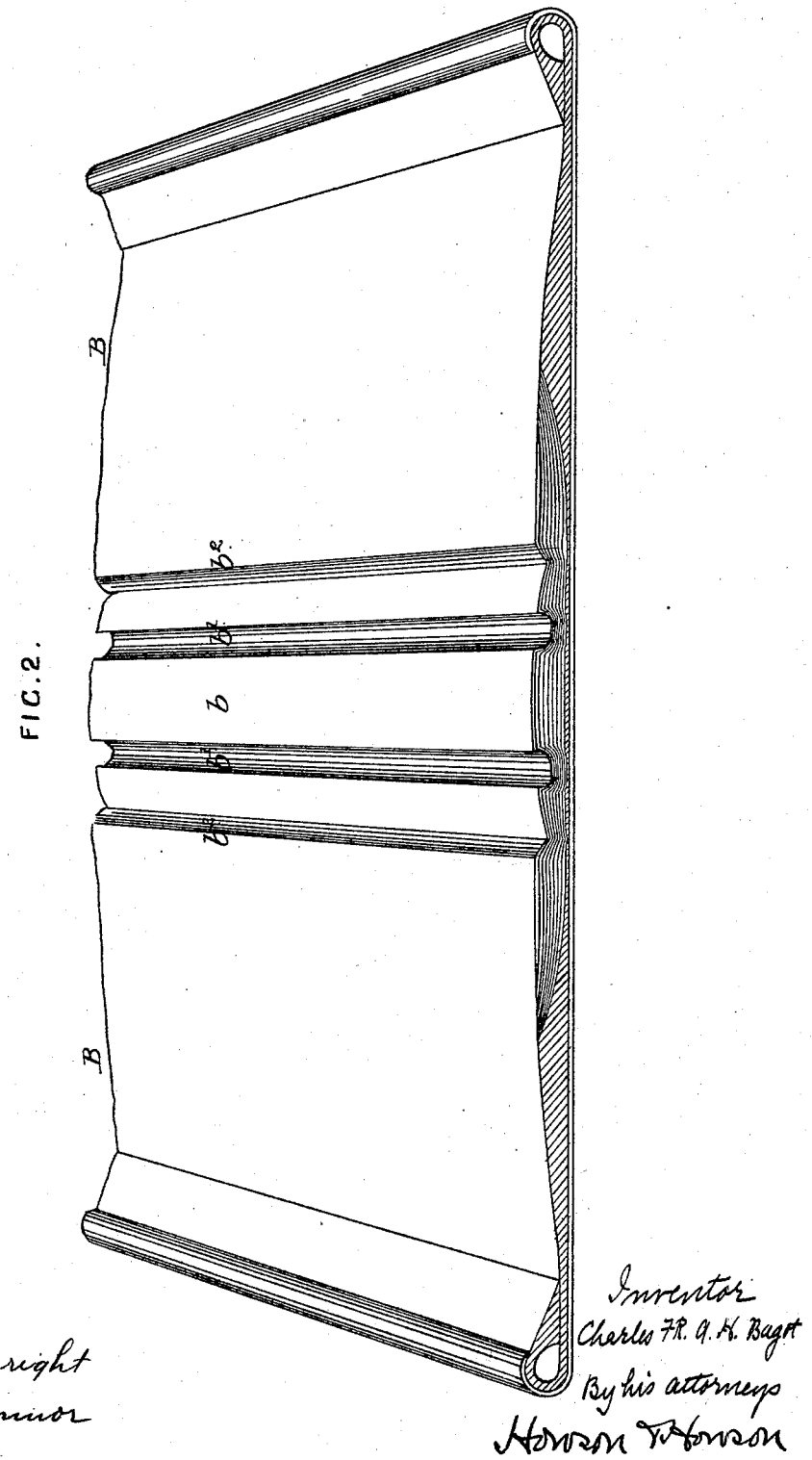

United States Patent Office.

CHARLES F. R. A. H. BAGOT, OF LONDON, ENGLAND.

PNEUMATIC TIRE.

SPECIFICATION forming part of Letters Patent No. 585,615, dated June 29, 1897.

Application filed June 29, 1896. Serial No. 597,425. (No model.) Patented in England March 24, 1896, No. 6,513; in Germany June 21, 1896, No. 90,873; in France June 24, 1896, No. 257,547; in Hungary June 25, 1896, No. 6,241; in Belgium June 26, 1896, No. 122,170; in Italy June 30, 1896, No. 237; in Switzerland July 2, 1896, No. 12,781; in Canada July 22, 1896, No. 53,002; in Spain September 2, 1896, No. 19,251; in Austria September 28, 1896, No. 46/3,770, and in India December 22, 1896, No. 3,657.

*To all whom it may concern:*

Be it known that I, CHARLES FITZ ROY ALEXANDER HALIFAX BAGOT, a subject of the Queen of Great Britain and Ireland, and a resident of 59 Cadogan Square, London, England, have invented certain Improvements in Pneumatic Tires for Velocipedes and other Vehicles, (for which I have obtained Letters Patent in England, No. 6,513[A], dated March 24, 1896; in Germany, No. 90,873, dated June 21, 1896; in France, No. 257,547, dated June 24, 1896; in Belgium, No. 122,170, dated June 26, 1896; in Austria, No. 46/3,770, dated September 28, 1896; in Hungary, No. 6,241, dated June 25, 1896; in Switzerland, No. 12,781, dated July 2, 1896; in Italy, No. 237, dated June 30, 1896; in Spain, No. 19,251, dated September 2, 1896; in India, No. 3,657[P], dated December 22, 1896, and in Canada, No. 53,002, dated July 22, 1896,) of which the following is a specification.

My invention has for its object to provide improved pneumatic tires for velocipedes and other vehicles, the said tires having an efficient and narrowed "tread," so that their running speed and their durability are increased and they not being liable to be injured by the application of the brake their narrowed tread and their resiliency being permanently maintained.

In describing my invention I will refer to the accompanying drawings, wherein—

Figure 1 is a section of a tire constructed in accordance with my invention. Fig. 2 is a part of a tire spread out, and Fig. 3 illustrates the application of the brake-shoe.

The portion of the vulcanized-rubber covering B of the tire which bears upon the ground I make in transverse section with a plain curved part at $b$, which and the parts contiguous to it are of what may be termed "specially-graduated vulcanization," (of layers hardest outward and gradually softer inward,) the said part $b$ being in cross-section struck with a smaller radius than from the center of the tire, as indicated in dotted lines in Fig. 3, and being in normal running the only part which bears on the ground. The hardening of the outer part or layer or tread proper is carried, preferably, to a greater degree than usual, and the hardening of the layers inward of this is less as they are situated inward, so that the innermost layer is softest and the inward part is left resilient to the fullest possible extent. This may be done by vulcanizing and "curing" separate layers so that they are of different degrees of hardness and then joining them with the hardest layer outermost and the softest layer innermost, the layers of intermediate hardness being interposed, so that in effect there is a gradually-lessening hardness inward, and then the whole of the tire thus formed is subjected to a further vulcanization and curing process. In the drawings the breadth of the lines represents the hard and soft parts, the thicker lines representing the harder layers and the thinner lines the softer layers. It is preferred to have the outermost layer vulcanized to as high a degree of hardness as possible consistent with the proper retention of tenacity and non-liability to split or crack, the innermost layer being very soft or resilient and the intervening layers being, as aforesaid, of gradually-increasing hardness from the inner to the outer layer. The narrowed and gradually-hardened tread thus made secures great durability of the tire and by reducing friction with the ground increases the speed of the machine to which the tire is applied. It also lessens risk of perforation of the air chamber or space. At each side of this narrowed tread the tire is formed with two ridges $b^2$, as shown in Fig. 3, bounded by arcs of circles struck as indicated. These portions of the tire act as thrust-pieces against which the thrust of the edge portions of the narrowed tread is received. The said projecting portions also bear on the road should the wheel tilt sidewise to a considerable extent, so as to guard against or reduce skidding and consequent sidewise falling of the machine. The recesses at $b'$, extending round the tread of the wheel, are for giving a lateral grip on the ground, and this action is to a minor degree similar to that of the projecting portions $b^2$. The mud instead of adhering to the tire and clogging its surface, as hitherto, is cast off as the wheel revolves.

As the tire presents no projections in the direction of rotation and the brake-shoe A is shaped, as shown in full lines in Fig. 3, so that it corresponds with the general curve of the cross-section of the periphery of the wheel from $x$ to $y$, the application of the brake causes no injury to the periphery of the wheel.

In Fig. 1, $c$ is the air-chamber, situated inside the tire, but the tire-covering may, if desired, be made a complete tube to itself constitute the air-chamber.

I have described the aforesaid gradual vulcanization as applied to a tire of the particular shape shown, but it may be applied to plain tires or tires of other shapes.

Having now particularly described and ascertained the nature of my said invention and in what manner the same is to be performed, I declare that what I claim is—

1. A tire having the tread portion formed with a plain curve struck from a smaller radius than from the center of the tire, recesses $b'$, $b'$ formed in and extending around the tread portion and ridges $b^2$, $b^2$, substantially as set forth.

2. A tire having the tread portion formed with a plain curve struck from a smaller radius than from the center of the tire, and recesses $b'$, $b'$ formed in and extending around the tread of the tire, said tread portion and adjoining parts being of gradually-increasing hardness, in cross-section, from the inside to the outside.

In testimony whereof I have signed my name to this specification in the presence of two subscribing witnesses.

C. F. R. A. H. BAGOT.

Witnesses:
 EDWD. GEO. DAVIES,
 WILLIAM F. UPTON.